US009160208B2

(12) United States Patent
Murata et al.

(10) Patent No.: US 9,160,208 B2
(45) Date of Patent: Oct. 13, 2015

(54) GENERATOR MOTOR AND WORK MACHINE

(75) Inventors: Hiroaki Murata, Hiratsuka (JP); Kouichi Watanabe, Hiratsuka (JP); Takao Nagano, Kawasaki (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 213 days.

(21) Appl. No.: 13/816,383

(22) PCT Filed: Mar. 26, 2012

(86) PCT No.: PCT/JP2012/057678
§ 371 (c)(1),
(2), (4) Date: Feb. 11, 2013

(87) PCT Pub. No.: WO2012/133259
PCT Pub. Date: Oct. 4, 2012

(65) Prior Publication Data
US 2013/0140927 A1    Jun. 6, 2013

(30) Foreign Application Priority Data

Mar. 31, 2011  (JP) ................................. 2011-077698

(51) Int. Cl.
*H02K 5/22* (2006.01)
*E02F 9/08* (2006.01)
*B60L 11/00* (2006.01)
(Continued)

(52) U.S. Cl.
CPC .............. *H02K 5/225* (2013.01); *B60L 11/005* (2013.01); *B60L 11/08* (2013.01); *B60L 11/18* (2013.01); *E02F 9/0858* (2013.01); *E02F 9/0866* (2013.01); *B60L 2200/40* (2013.01); *Y02T 10/641* (2013.01); *Y02T 10/70* (2013.01); *Y02T 10/7005* (2013.01); *Y02T 10/7022* (2013.01); *Y02T 10/7077* (2013.01); *Y02T 90/16* (2013.01)

(58) Field of Classification Search
CPC .................................. H02K 5/04; H02K 5/225
USPC .................................... 310/71, 89, 52
See application file for complete search history.

(56) References Cited

U.S. PATENT DOCUMENTS 4,807,354 A * 2/1989 Capuano et al. ................. 29/596
4,866,316 A * 9/1989 Humphries et al. ............. 310/71
(Continued)

FOREIGN PATENT DOCUMENTS

CN    2770205 Y    4/2006
CN    101621227 A    1/2010
(Continued)

OTHER PUBLICATIONS

Office Action issued May 14, 2013 in corresponding Japanese Patent Application No. 2011-077698, including English translation, 7 pages.
(Continued)

*Primary Examiner* — Joshua Benitez-Rosario
*Assistant Examiner* — Naishadh Desai
(74) *Attorney, Agent, or Firm* — Fish & Richardson P.C.

(57) ABSTRACT

A generator motor connected to an output shaft of an engine mounted in a work machine includes a terminal box for connecting an exterior electric-power-supplying cable to the generator motor. The terminal box includes a casing having an inner space in communication with an inside of a housing of the generator motor. A casing of the terminal box is detachably provided to the housing of the generator motor.

20 Claims, 14 Drawing Sheets

(51) Int. Cl.
　　B60L 11/18　　(2006.01)
　　B60L 11/08　　(2006.01)

(56) References Cited

U.S. PATENT DOCUMENTS

| | | | |
|---|---|---|---|
| 5,060,891 A * | 10/1991 | Nagy et al. | 248/56 |
| 5,769,659 A * | 6/1998 | Ceylan | 439/521 |
| 5,949,167 A | 9/1999 | Blalock | |
| 6,989,517 B2 * | 1/2006 | Owens et al. | 219/622 |
| 7,619,331 B2 * | 11/2009 | Bouiller et al. | 310/52 |
| 7,977,585 B2 | 7/2011 | Yoshizawa et al. | |
| 8,283,821 B2 * | 10/2012 | Ohashi et al. | 310/71 |
| 8,829,743 B2 * | 9/2014 | Watanabe et al. | 310/54 |
| 2001/0001638 A1 * | 5/2001 | Hirooka | 417/410.1 |
| 2004/0092134 A1 | 5/2004 | Morikaku | |
| 2005/0208782 A1 * | 9/2005 | Reed et al. | 439/34 |
| 2007/0217905 A1 * | 9/2007 | Bouiller et al. | 415/122.1 |
| 2009/0199553 A1 * | 8/2009 | Nishimura et al. | 60/486 |
| 2009/0256437 A1 * | 10/2009 | Miura et al. | 310/71 |
| 2009/0267432 A1 * | 10/2009 | Henry et al. | 310/71 |
| 2010/0000786 A1 | 1/2010 | Yoshizawa | |
| 2010/0148894 A1 * | 6/2010 | Ohashi et al. | 335/216 |

FOREIGN PATENT DOCUMENTS

| | | |
|---|---|---|
| CN | 101958602 A | 1/2011 |
| JP | S53-041605 U | 11/1978 |
| JP | H01-116555 U | 5/1989 |
| JP | H02-051340 A | 2/1990 |
| JP | H04-156248 A | 5/1992 |
| JP | H04-334944 A | 11/1992 |
| JP | H08-37752 A | 2/1996 |
| JP | 2003-244889 A | 8/2003 |
| JP | 2004-153891 A | 5/2004 |
| JP | 2006-152740 A | 6/2006 |
| JP | 2008-067546 A | 3/2008 |
| JP | 2009-118602 A | 5/2009 |
| JP | 2009-283297 A | 12/2009 |
| JP | 2010-017034 A | 1/2010 |
| JP | 2010-51046 A | 3/2010 |
| JP | 2010-268633 A | 11/2010 |
| JP | 2010-272254 A | 12/2010 |
| WO | 2008-015798 A1 | 2/2008 |

OTHER PUBLICATIONS

English translation of International Preliminary Report on Patentability issued Oct. 8, 2013 from corresponding International Application No. PCT/JP2012/057678, 6 pages.
Notice of Reason(s) for Rejections dated Jan. 8, 2013 from Japanese Application No. JP 2011-077698, including English translation, 5 pages.
International Search Report dated May 22, 2012 from International Application No. PCT/JP2012/057678, including English translation, 4 pages.
Office Action dated Sep. 17, 2014 for corresponding Chinese Patent Application No. 201280002433.X, including English Translation, 17 pages.
Office Action dated Sep. 9, 2014 from corresponding Japanese Patent Application No. 2013-147771, including English translation, 8 pages.

* cited by examiner

GENERATOR MOTOR AND WORK MACHINE

CROSS-REFERENCE TO RELATED APPLICATIONS

This application claims priority to International Application No. PCT/JP2012/057678 filed on Mar. 26, 2012, which application claims priority to Japanese Application No. 2011-077698, filed on Mar. 31, 2011. The contents of the above applications are incorporated herein by reference in their entireties.

TECHNICAL FIELD

The present invention relates to a generator motor and a work machine, particularly, improvement in a generator motor connected to an output shaft of an engine mounted in a work machine.

BACKGROUND ART

As a work machine, there has been known a hybrid construction machine in which an engine drives a generator motor and a hydraulic pump, whereby an electric motor for an upper rotary body where a cab and the like are provided is driven by electric power generated by the generator motor while a hydraulic actuator for an operating device and a hydraulic motor for a traveling device are driven by a pressure oil from the hydraulic pump.

In the hybrid construction machine, the generator motor and an inverter are electrically connected to each other via an electric-power-supplying cable. The generator motor and the inverter are connected to the electric-power-supplying cable via respective connectors. Such a hybrid construction machine has been known for an arrangement that a terminal box is provided to a housing of the generator motor in order to house the connector of the generator motor (see, for instance, Patent Literature 1).

CITATION LIST

Patent Literature(s)

Patent Literature 1 JP-A-2010-272254

SUMMARY OF THE INVENTION

Problem(s) to be Solved by the Invention

The housing of the generator motor is formed with a cable-insertion hole in which a conductive line from a stator coil of the generator motor is inserted. Through the cable-insertion hole, a conductive line is drawn into the terminal box. In this arrangement, in assembling the generator motor, it is necessary to draw the conductive line from the stator coil into the terminal box through the cable-insertion hole while housing a stator in the housing.

However, in the generator motor disclosed in Patent Literature 1, since the terminal box is integrally casted with the housing of the generator motor, the terminal box is unremovable from the housing. Accordingly, when the conductive line is drawn into the terminal box, drawing the conductive line is time-consuming because of disturbance by the terminal box, so that a satisfactory assembly performance cannot be secured.

An object of the invention is to provide a generator motor having an improved assembly performance and a work machine in which the generator motor is mounted.

Means for Solving the Problem(s)

According to an aspect of the invention, a generator motor connected to an output shaft of an engine mounted in a work machine includes: a terminal box for connecting an exterior electric-power-supplying cable to the generator motor, in which the terminal box includes a casing having an inner space in communication with an inside of a housing of the generator motor, and the casing of the terminal box is detachably provided to the housing of the generator motor.

In the above aspect of the invention, the casing of the terminal box is made of a material having a lighter weight than that of a material for the housing of the generator motor.

In the above aspect of the invention, the casing of the terminal box is made of an anti-corrosive material or a surface of the casing is treated with a corrosion protection processing.

In the above aspect of the invention, the casing of the terminal box is made of aluminium.

In the above aspect of the invention, the casing of the terminal box includes: a case detachably provided to the housing of the generator motor; and a cover member for closing an inner space of the case with a seal member interposed between the cover member and the case, in which the casing is made of aluminium, and the cover member is made of a steel material having a galvanized surface.

In the above aspect of the invention, an inside of the generator motor is cooled by a cooling medium, and the terminal box is attached to the generator motor at a position higher than the rotation shaft of the generator motor.

In the above aspect of the invention, the terminal box is attached to the generator motor at a position lower than a top surface of the generator motor.

The generator motor in the above aspect of the invention further includes a cable-insertion hole that communicates the inside of the generator motor with an inside of the terminal box; and a closing member that closes the cable-insertion hole except for the cable.

The generator motor in the above aspect of the invention further includes, in addition to the cable-insertion hole, a communication hole that communicates the inside of the generator motor with the inside of the terminal box.

In the above aspect of the invention, the terminal box houses a connector for connecting the exterior electric-power-supplying cable to the generator motor; and, while the terminal box is provided to the housing of the generator motor, the connector is disposed facing downward and the electric-power-supplying cable is connectable to the connector from underneath the connector.

In the above aspect of the invention, the terminal box houses a plurality of connectors for connecting the exterior electric-power-supplying cable to the generator motor; and, while the terminal box is provided to the housing of the generator motor, the plurality of connectors are juxtaposed in a direction of the rotation shaft of the generator motor.

According to another aspect of the invention, a work machine includes: working equipment; a hydraulic pump that drives the working equipment; and the generator motor according to the above aspect of the invention, in which the hydraulic pump is provided to the generator motor.

According to the above aspect of the invention, the terminal box for connecting the exterior electric-power-supplying cable to the generator motor is detachably provided to the housing of the generator motor. Accordingly, while the terminal box is kept detached from the generator motor, the stator can be housed in the housing of the generator motor and the conductive line of the stator coil can be easily pulled out from the housing of the generator motor. Once the conductive line is pulled out, the pulled-out conductive line can be easily drawn into the terminal box. Accordingly, when the conductive line is drawn into the terminal box, disturbance by the terminal box is preventable, so that a satisfactory assembly performance can be secured.

Since the centroid of the generator motor is displaced from the rotation shaft toward the terminal box if the terminal box has a heavy weight, vibration caused by impact during travelling and impact from the working equipment may be increased, or vibration caused by driving of the engine and the hydraulic pump may be increased.

According to the above aspect of the invention, since the casing of the terminal box is made of a material having a lighter weight than a weight of a material for the housing of the generator motor, the weight of the terminal box can be lighter than a weight of the terminal box integrally formed with the housing of the generator motor. Accordingly, the centroid of the generator motor can be brought toward the rotation shaft, so that vibration is suppressible.

According to the above aspect of the invention, since the casing of the terminal box is made of the anti-corrosive material or the surface of the casing is treated with a corrosion protection processing, generation of rust on an interior and an exterior of the casing can be inhibited. Accordingly, occurrence of short-circuit or grounding caused by rust on the casing as well as corrosion of the casing are preventable.

According to the above aspect of the invention, since the cover member of the terminal box is made of aluminium, the terminal box can be significantly light-weighted as compared with an arrangement that the terminal box is made of, for instance, iron, which can greatly contribute to suppression of vibration.

According to the above aspect of the invention, the cover material of the terminal box closes the inner space of the case with the seal member interposed between the cover material and the case. Here, since the cover member receives a counterforce from the seal member, the cover member needs to be rigid enough to resist deformation by this counterforce. Since the cover member is made of a steel material having a galvanized surface, a sufficient rigidity can be secured and anti-corrosive performance against rust and the like can be secured. Moreover, the production cost of such a cover material is more reducible than that of the cover member made of aluminium. Further, since the case is made of aluminium, the weight of the terminal box is reducible by a weight of the case. Accordingly, anti-corrosive performance of the terminal box can be improved and the weight thereof can be light-weighted.

According to the above aspect of the invention, since the inside of the generator motor is cooled by the cooling medium, a bearing, a stator coil and the like in the generator motor can be cooled. In this arrangement, since the terminal box is attached to the generator motor at a position higher than the rotation shaft of the generator motor, the cooling medium in the inside of the generator motor can be inhibited from entering the terminal box through the communication portion between the generator motor and the terminal box.

According to the above aspect of the invention, since the terminal box is provided to the generator motor at a position lower than the top surface of the generator motor, the terminal box can be inhibited from projecting upward beyond the generator motor. Accordingly, the terminal box can be prevented from interfering with the devices, members and the like provided above the generator motor.

According to the above aspect of the invention, since the cable-insertion hole that communicates the inside of the generator motor with the inside of the terminal box is provided, the conductive line from the stator-coil of the generator motor and a signal line from the sensor of the generator motor can be drawn into the terminal box by inserting those lines into the cable-insertion hole. Accordingly, it is not necessary to draw the conductive line and the signal line around the exterior of the generator motor, so that the conductive line and the signal line can be protected from moisture and dust in the outside. Moreover, since the closing member for closing the cable-insertion hole except for the cable therein is provided, the cooling medium and moisture in the generator motor can be inhibited from entering the terminal box.

According to the above aspect of the invention, since a cooling-medium return hole in communication with the inside of the generator motor and the inside of the terminal box is provided in addition to the cable-insertion hole, the cooling medium and moisture having entered the terminal box through the generator motor can be returned into the generator motor.

According to the above aspect of the invention, while the terminal box is provided to the housing of the generator motor, the electric-power-supplying cable is disposed facing downward and is connectable to the connector from underneath the connector. In this arrangement, the electric-power-supplying cable connected to the connector extends downward along the generator motor from the terminal box. Accordingly, since the electric-power-supplying cable can be suppressed from projecting beyond the generator motor, the generator motor can be more freely disposed.

Moreover, since the connector is provided facing downward, moisture such as water drops from the above is prevented from entering the terminal box through the connector.

According to the above aspect of the invention, since the connectors in the terminal box are juxtaposed in a direction of the rotation shaft of the generator motor, the terminal box can be prevented from being enlarged in an in-plane direction orthogonal to the rotation shaft of the generator motor due to the arrangement of the connectors, so that a size of the terminal box in the orthogonal surface can be minimized. Accordingly, since the terminal box can be downsized, the weight of the terminal box can be reduced, thereby promoting the light-weighted generator motor. Moreover, since the centroid of the generator motor to which the terminal box is provided can be brought toward the rotation shaft of the generator motor by reducing the weight of the terminal box, vibration of the generator motor and vibration of the engine to which the generator motor is connected can be suppressed. Further, since downsizing the terminal box suppresses the terminal box from significantly projecting beyond the generator motor, the generator motor can be more freely disposed.

According to the another aspect of the invention, the work machine providing the above-described advantages of the invention can be obtained by including the generator motor. Moreover, the hydraulic pump for driving the working equipment of the work machine is provided to the generator motor. In this arrangement, although vibration caused by driving of the hydraulic pump is transmitted to the generator motor, since the centroid of the generator motor can be brought toward the rotation shaft by downsizing of the terminal box, vibration caused by driving the hydraulic pump can be effectively suppressed.

DESCRIPTION OF EMBODIMENT(S)

An exemplary embodiment of the invention will be described below with reference to the drawings. Note that components described below can be combined as needed.

1. Overall Structure

Figure 1:
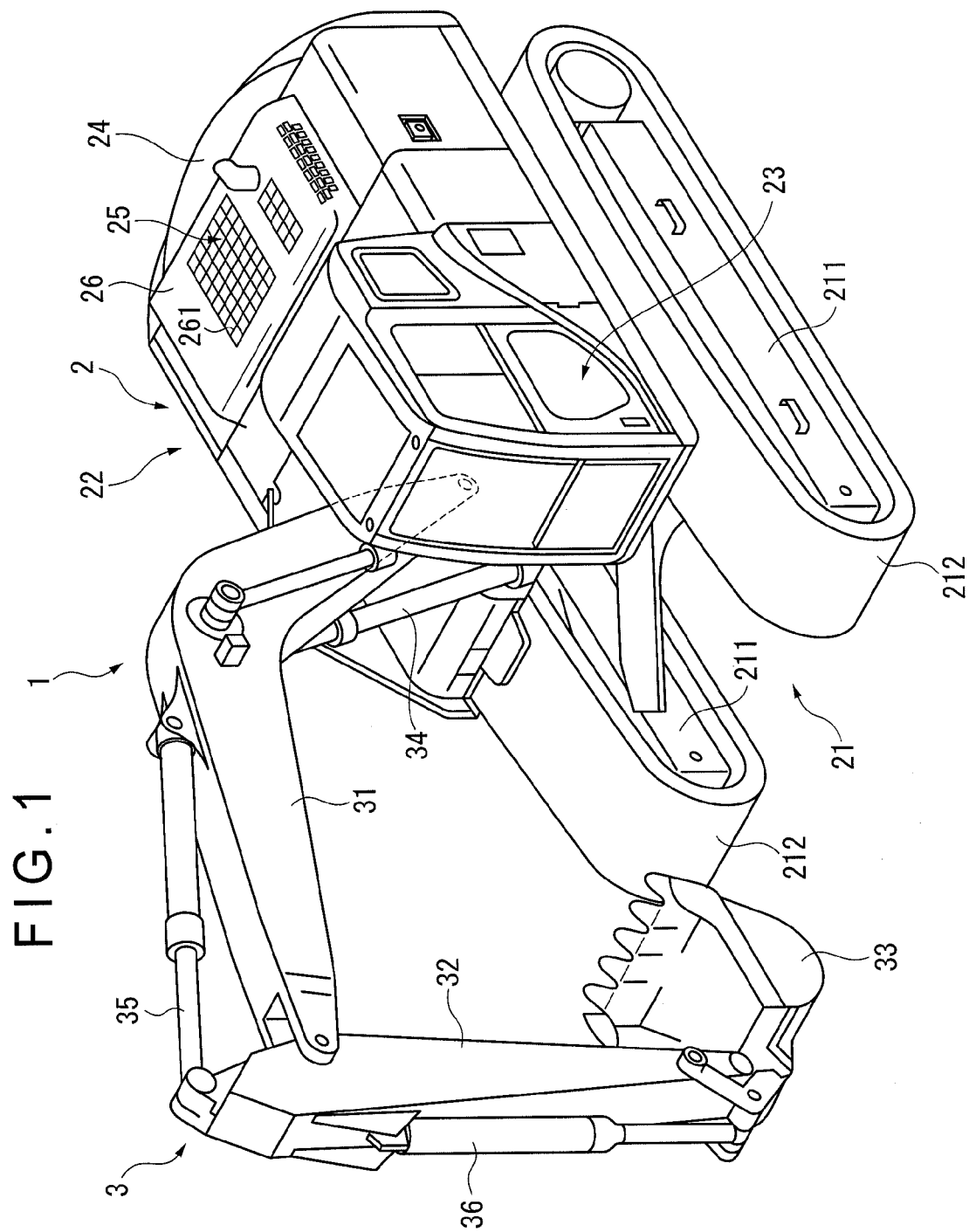
FIG. 1 is a perspective view of a hybrid hydraulic excavator according to an exemplary embodiment of the invention.

FIG. 1 shows a hybrid hydraulic excavator 1 serving as a work machine according to the exemplary embodiment. The hybrid hydraulic excavator 1 includes a vehicle body 2 and working equipment 3.

The vehicle body 2 includes a carrier 21 and a rotary body 22 rotatably provided on the carrier 21. The carrier 21 includes a pair of traveling devices 211. The respective traveling devices 211 are provided with crawler belts 212. A later-described hydraulic motor 213 drives the crawler belts 212, whereby the hybrid hydraulic excavator 1 travels.

The rotary body 22 includes a cab 23, a counterweight 24 and an engine room 25. The counterweight 24 is provided for weight balance against the working equipment 3 and is filled with weights. An engine hood 26 covering the engine room 25 has a grid-like opening 261. A cooling air from the outside is taken in the engine room 25 through the opening 261.

The working equipment 3 is attached to a front center of the rotary body 22 and includes a boom 31, an arm 32, a bucket 33, a boom cylinder 34, an arm cylinder 35 and a bucket cylinder 36. A base end of the boom 31 is rotatably connected to the rotary body 22. A distal end of the boom 31 is rotatably connected to a base end of the arm 32. A distal end of the arm 32 is rotatably connected to the bucket 33.

The boom cylinder 34, the arm cylinder 35 and the bucket cylinder 36 are hydraulic cylinders driven by hydraulic oil discharged from the hydraulic pump 6. The boom cylinder 34 actuates the boom 31. The arm cylinder 35 actuates the arm 32. The bucket cylinder 36 actuates the bucket 33.

Figure 2:
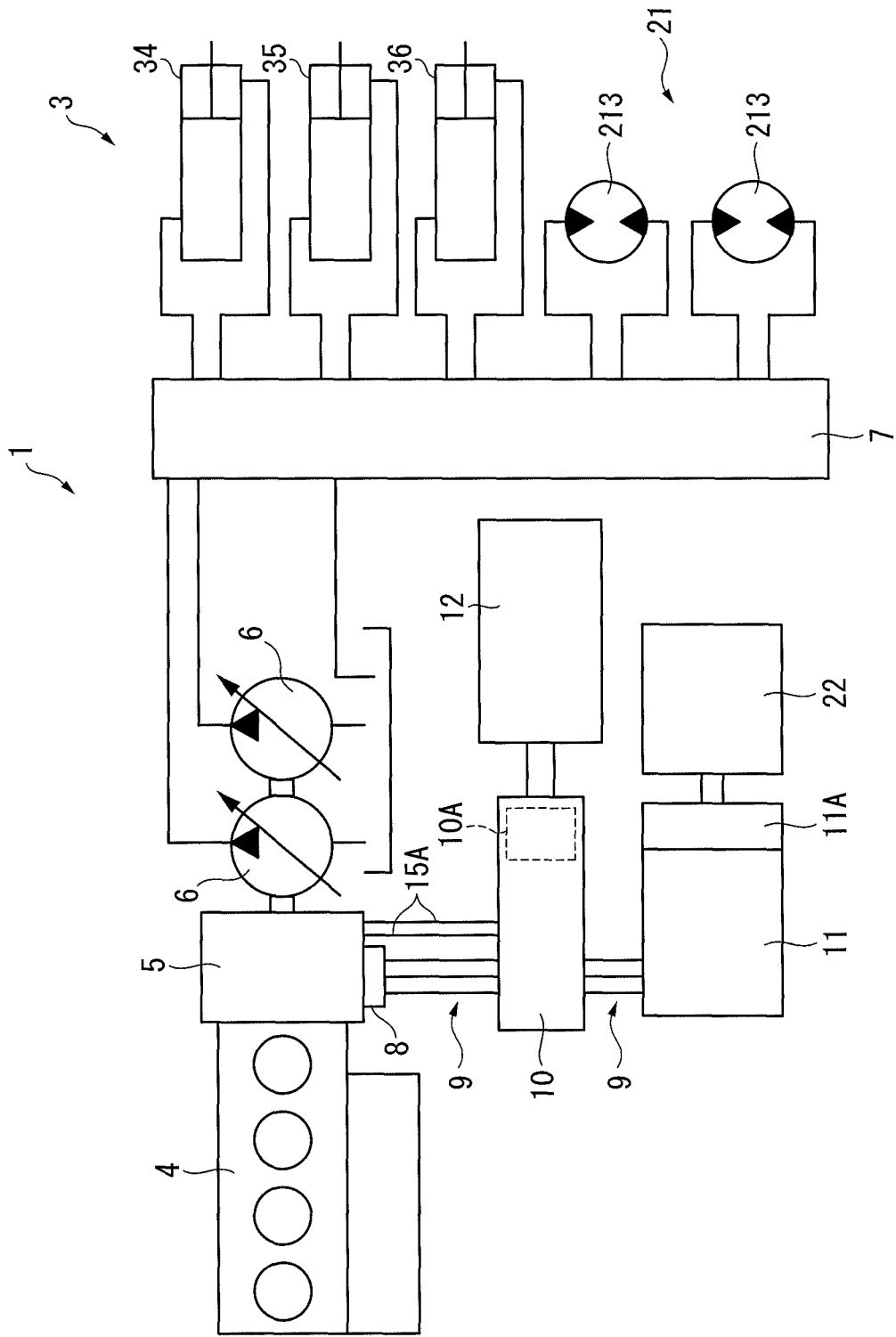
FIG. 2 shows an overall structure of a driving system of the hybrid hydraulic excavator.

FIG. 2 shows an overall structure of a driving system of the hybrid hydraulic excavator 1.

In FIG. 2, the hybrid hydraulic excavator 1 includes an engine 4 as a driving source. The generator motor 5 and a pair of hydraulic pumps 6,6 are connected in series to an output shaft of the engine 4 and are driven by the engine 4.

The hydraulic oil fed by pressure from the hydraulic pump 6 is supplied to the working equipment 3 through a control valve 7, whereby the working equipment 3 is hydraulically actuated. The carrier 21 is provided with the hydraulic motor 213 for driving a sprocket to be meshed with a crawler. The hydraulic oil from the hydraulic pump 6 is supplied to the hydraulic motor 213 through the control valve 7.

On the other hand, the generator motor 5 is connected to a power cable 9 (an electric-power-supplying cable) through the terminal box 8. The generator motor 5 and an inverter 10 are connected to each other through the power cable 9. One end of another power cable 9 is connected to the inverter 10 while the other end of the power cable 9 is connected to a rotary electric motor 11 for driving the rotary body 22. Moreover, a capacitor 12 for storing electric power is connected to the inverter 10. Accordingly, electric power generated by the generator motor 5 is supplied to the rotary electric motor 11 or stored in the capacitor 12 through the inverter 10. The rotary electric motor 11 drives the rotary body 22 rotatably provided to a top of an undercarriage through a reducer 11A having a planet gear mechanism and the like When the speed of the rotary body 22 is reduced during rotary movement, regenerative braking causes the rotary electric motor 11 to generate electric power. This electric power is stored in the capacitor. The electric power charged in the capacitor 12 is boosted by a booster 10A and is supplied from the capacitor 12 through the inverter 10 to the rotary electric motor 11 and the generator motor 5 for assisting the engine 4 in driving.

Figure 3:
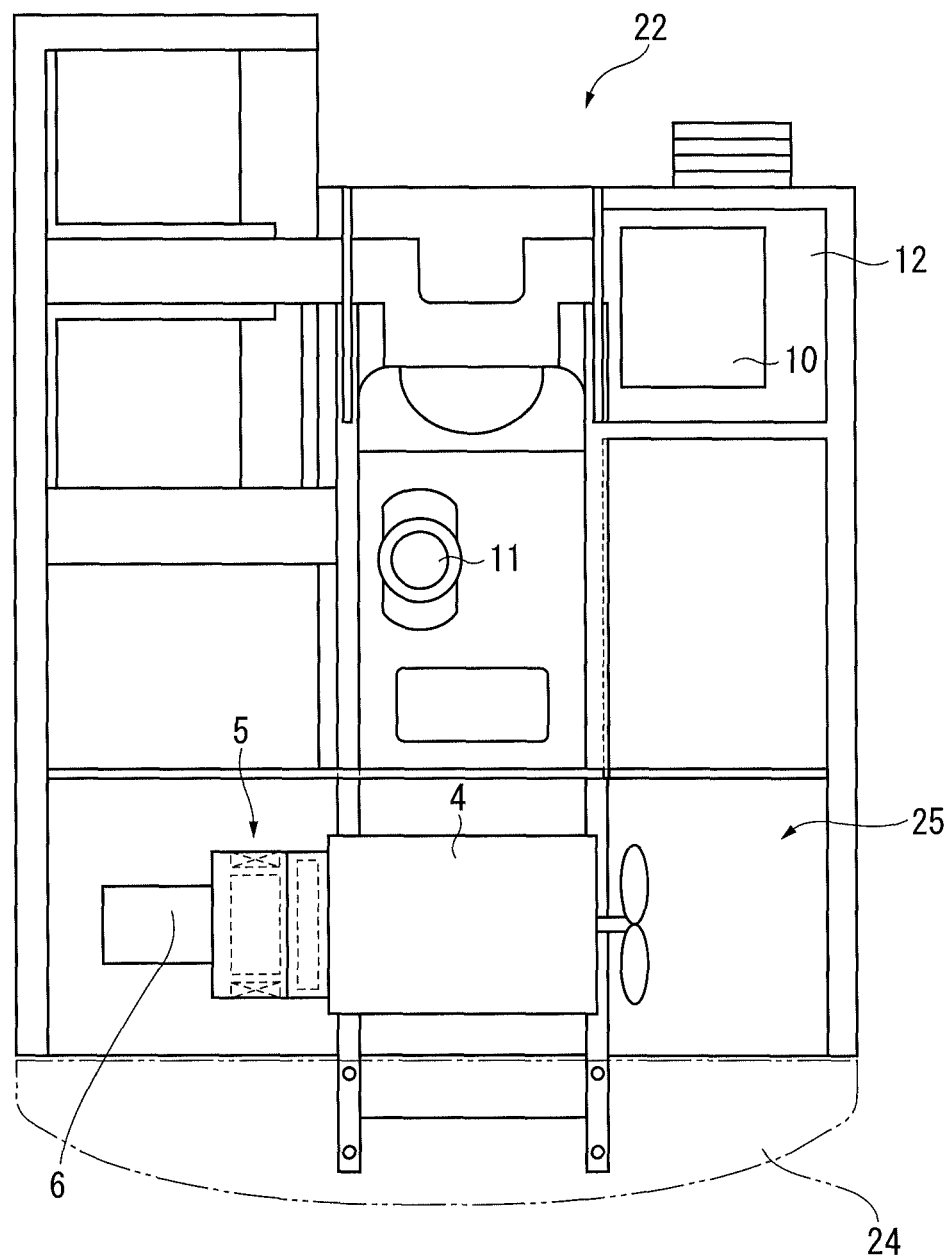
FIG. 3 shows an inner structure and arrangement of a rotary body of the hybrid hydraulic excavator.

FIG. 3 shows an inner structure and arrangement of the rotary body 22.

In FIG. 3, the inverter 10 and the capacitor 12 are provided on a vehicle front side of the rotary body 22. The rotary electric motor 11 is provided in the center of the rotary body 22. The engine room 25 is provided on a rear side of the rotary body 22. The counterweight 24 is provided in a further rear of the engine room 25. In the engine room 25, the engine 4, the generator motor 5 and the hydraulic pump 6 are juxtaposed along the counterweight 24. Since the engine 4, the generator motor 5 and the hydraulic pump 6 are required to be disposed within a limited space of a vehicle such as the rotary body 22, and in consideration of a power transmission efficiency, the engine 4, the generator motor 5 and the hydraulic pump 6 are preferably disposed such that rotation shafts thereof are aligned.

Figure 4:
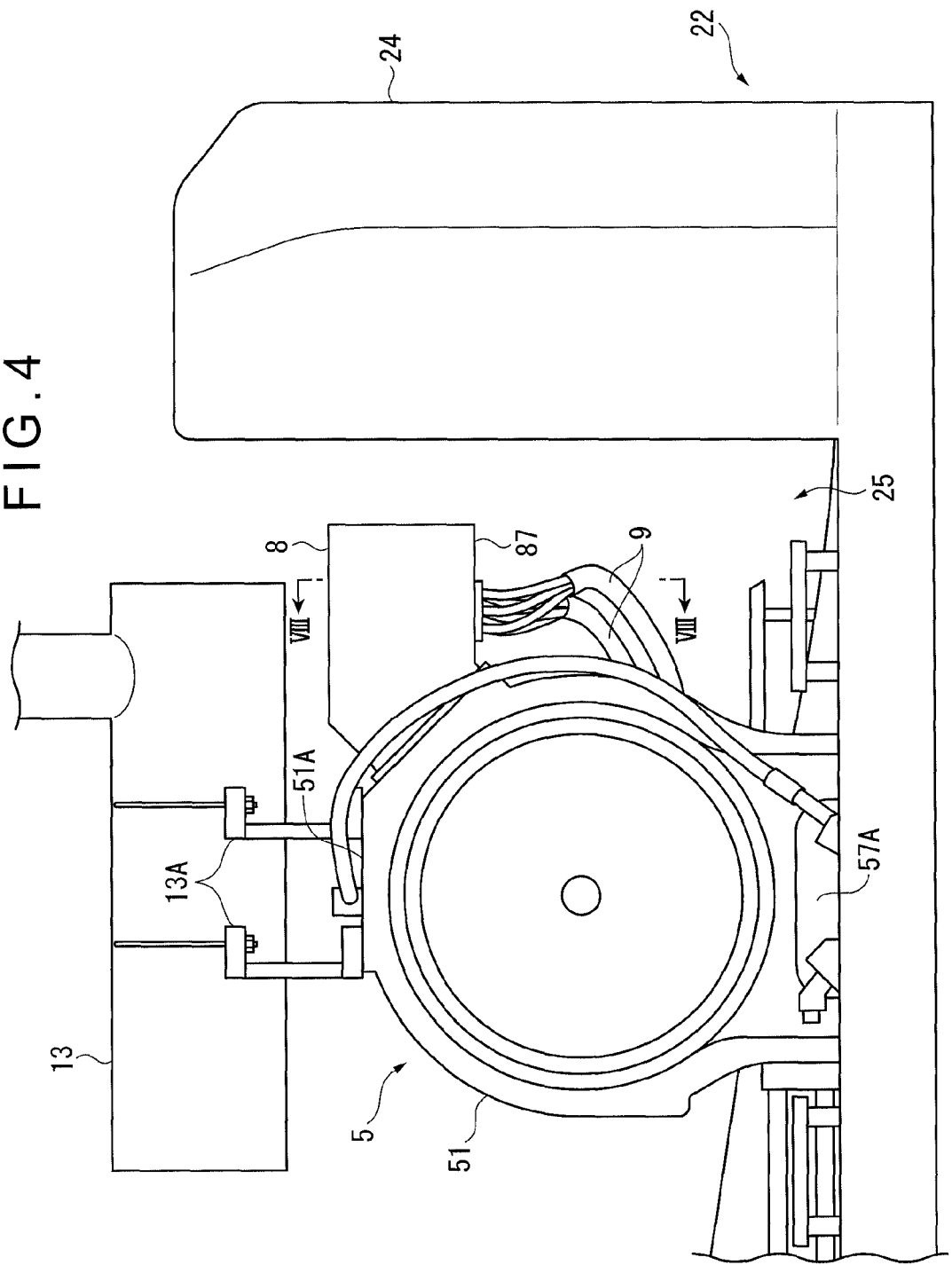
FIG. 4 is a plan view of a generator motor mounted in the hybrid hydraulic excavator.

As shown in FIG. 4, the terminal box 8 is provided to an outer surface of a housing 51 of the generator motor 5. Specifically, the terminal box 8 is fixed to the housing 51 at a position on the housing 51 near the counterweight 24 and between the rotation shaft of the generator motor 5 and an upper surface 51A of the housing 51. The terminal box 8 is formed as a separate body from the housing 51 of the generator motor 5 and is detachably attached to the housing 51.

Figure 5:
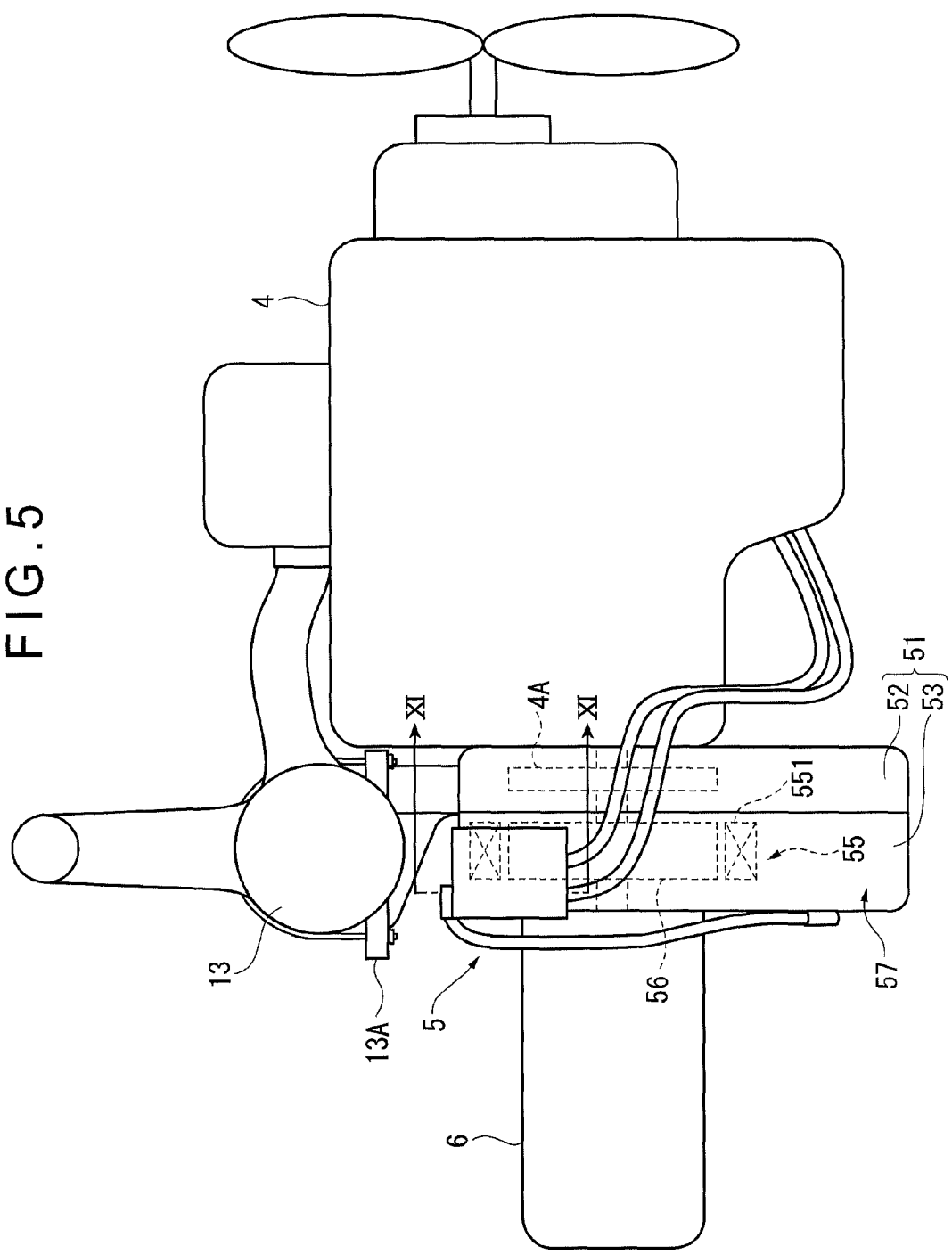
FIG. 5 is a side view of each of the generator motor, an engine and a hydraulic pump.

As shown in FIGS. 4 and 5, a muffler 13 is provided above the terminal box 8. The muffler 13 is fixed to a top of the generator motor 5 through a bracket 13A. Thus, the terminal box 8 is surrounded by the counterweight 24 and the muffler 13. On a bottom 813 of the terminal box 8, a plugging/unplugging opening 813A for the power cable 9 is provided (see FIGS. 9 and 11), whereby one end of the power cable 9 can be detachably connected to the terminal box 8 from underneath the terminal box 8. The other end of the power cable 9 is extended downward from the terminal box 8 and connected to the inverter 10 while passing under the engine 4.

In this arrangement, an openable/closable under-cover is provided on a bottom of the rotary body 22 under the engine 4. When the under-cover is opened, an operator or maintenance staff can squeeze his upper body into engine room 25.

Accordingly, for maintenance of devices in the engine room 25, the power cable 9 can be easily plugged in or unplugged from the terminal box 8 through the bottom of the terminal box 8

2. Structure of Generator Motor

The generator motor 5, which is a three-phase SR (Switched Reluctance) motor, includes a separable housing 51 as shown in FIG. 5. The housing 51 includes an engine-side housing 52 that is fixed to the engine 4 and houses a flywheel 4A; and a pump-side housing 53 that is fixed to the engine-side housing 52.

The pump-side housing 53 has a circular opening toward the hydraulic pump 6. This opening is covered with a disc-like support member 54 (see FIG. 6) that rotatably supports a rotor 56. By closing the opening with the support member 54, the rotor 56 is housed in a stator 55, and simultaneously, one end of a shaft provided in the rotation center of the rotor 56 is connected (e.g., splined) to an output shaft of the engine 4 or a member connected to the output shaft. The other end of the shaft is provided corresponding to a center hole of the support member 54 and is splined or the like to an input shaft of the hydraulic pump 6 through the center hole.

An oil reservoir 57 is provided in a lower part of the housing 51. In the oil reservoir 57, a cooling oil as a cooling medium is accumulated. The cooling oil in the oil reservoir 57 is circulated to an oil cooler 57A (see FIGS. 4 and 6) through a filter and a pump (not shown) of an outside pipe and is returned from the oil cooler 57A to an upper part of the pump-side housing 53. The cooling oil returned from the upper part of the pump-side housing 53 to the inside of the housing 51 flows radially outward from the center of the rotation shaft because of centrifugal force while lubricating the splined portions among the output shaft of the engine 4, the rotor 56 and hydraulic pump 6, and a bearing of the rotor 56. The cooling oil is splashed by the rotating rotor 56 and flywheel 4A into mist to cool a stator coil 551 provided in the stator 55. Subsequently, the cooling oil drops into the oil reservoir 57 from the cooled part of the stator coil 551.

Figure 6:
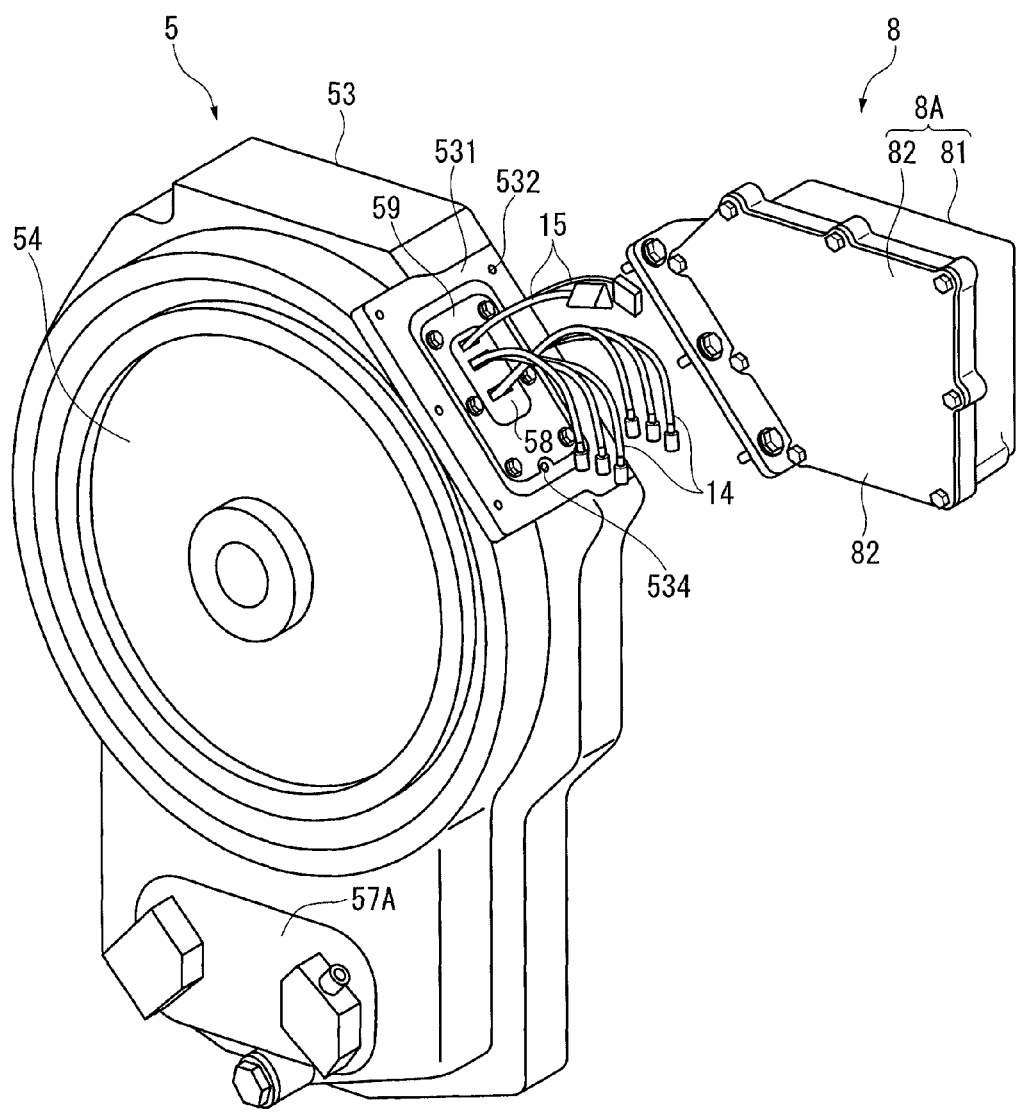
FIG. 6 is a perspective view of a pump-side housing of the generator motor.
Figure 7:
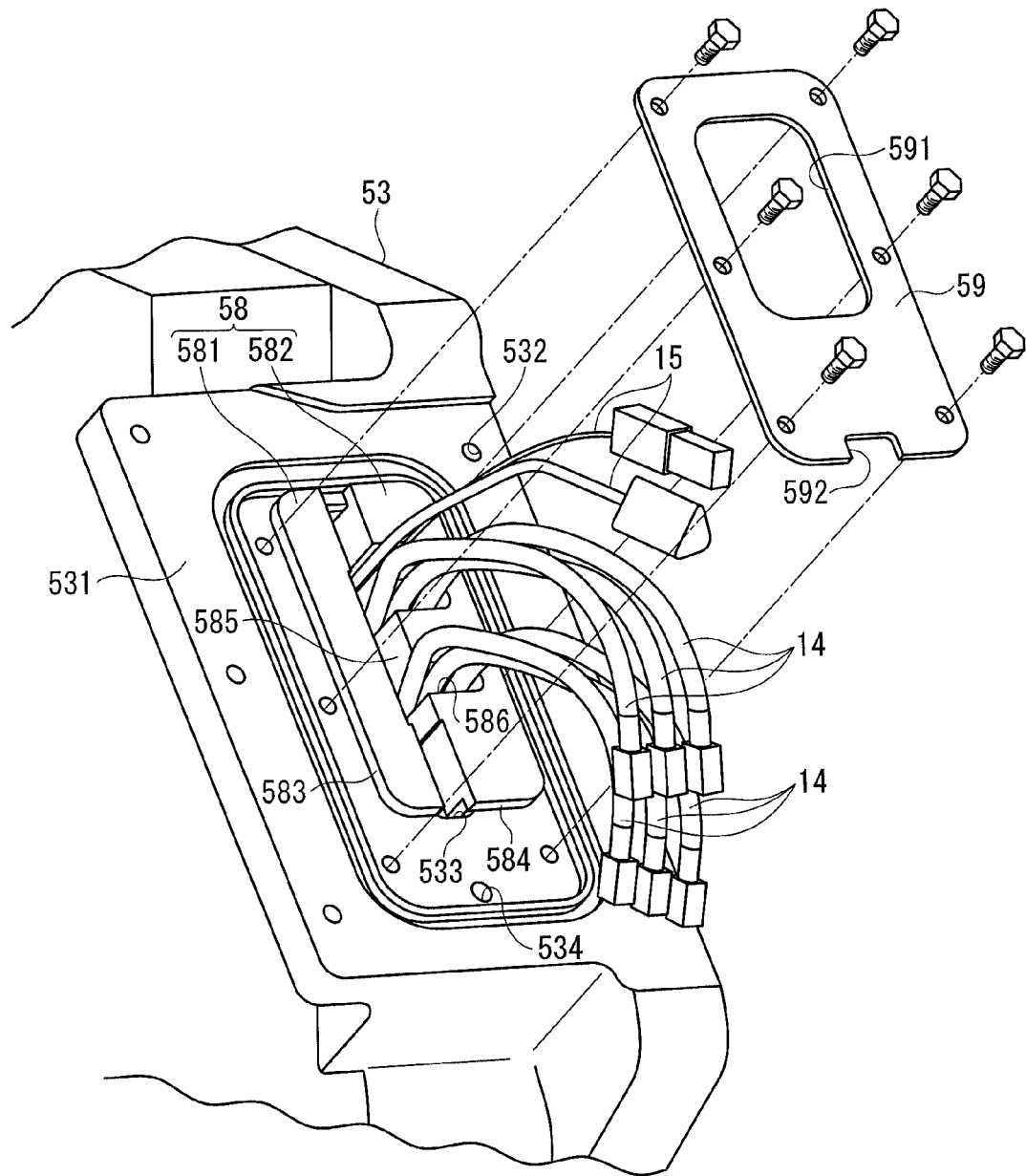
FIG. 7 is a partially enlarged view of the pump-side housing.

FIGS. 6 and 7 show the pump-side housing 53.

In FIGS. 6 and 7, a fixing portion 531 for fixing the terminal box 8 is provided at a fixing position of the terminal box 8 in the pump-side housing 53. The fixing portion 531 includes: a bolt hole 532 for fixing the terminal box 8; a cable-insertion hole 533 in which the conductive line 14 from the stator coil 551 is inserted (see FIG. 7); and an oil return hole 534 (i.e., communication hole) through which the oil fed in the terminal box 8 through the cable-insertion hole 533 is returned to the inside of the generator motor 5.

In this arrangement, sensors such as a temperature sensor that detects a temperature of the stator coil 551 and a rotation sensor that detects a rotation speed of the rotor 56 of the generator motor 5 are provided to the generator motor 5. A plurality of signal lines 15 from the sensors are drawn into the terminal box 8 through the cable-insertion hole 533 together with the conductive line 14 from the stator coil 551.

As shown in FIG. 7, a grommet 58 is fitted as a closing member in the cable-insertion hole 533. The grommet 58 is formed in separate parts of a first member 581 and a second member 582. Flanges 583 and 584 are respectively formed on edges of the first member 581 and the second member 582. Three insertion grooves 586 for inserting the conductive line 14 and the signal lines 15 are formed on a contact surface 585 of the second member 582 in contact with the first member 581. While the grommet 58 is fitted into the cable-insertion hole 533 of the pump-side housing 53 to close the cable-insertion hole 533 except for the conductive line 14 and the signal lines 15, a surface of the grommet 58 is pressed by a press member 59. The press member 59 includes a cable-insertion hole 591 for inserting the conductive line 14 and the signal lines 15, and a notch 592 formed by cutting the press member 59 at a position corresponding to the oil return hole 534 of the pump-side housing 53. The terminal box 8 in this arrangement is fixed to the fixing portion 531 of the pump-side housing 53.

3. Structure of Terminal Box

Figure 8:
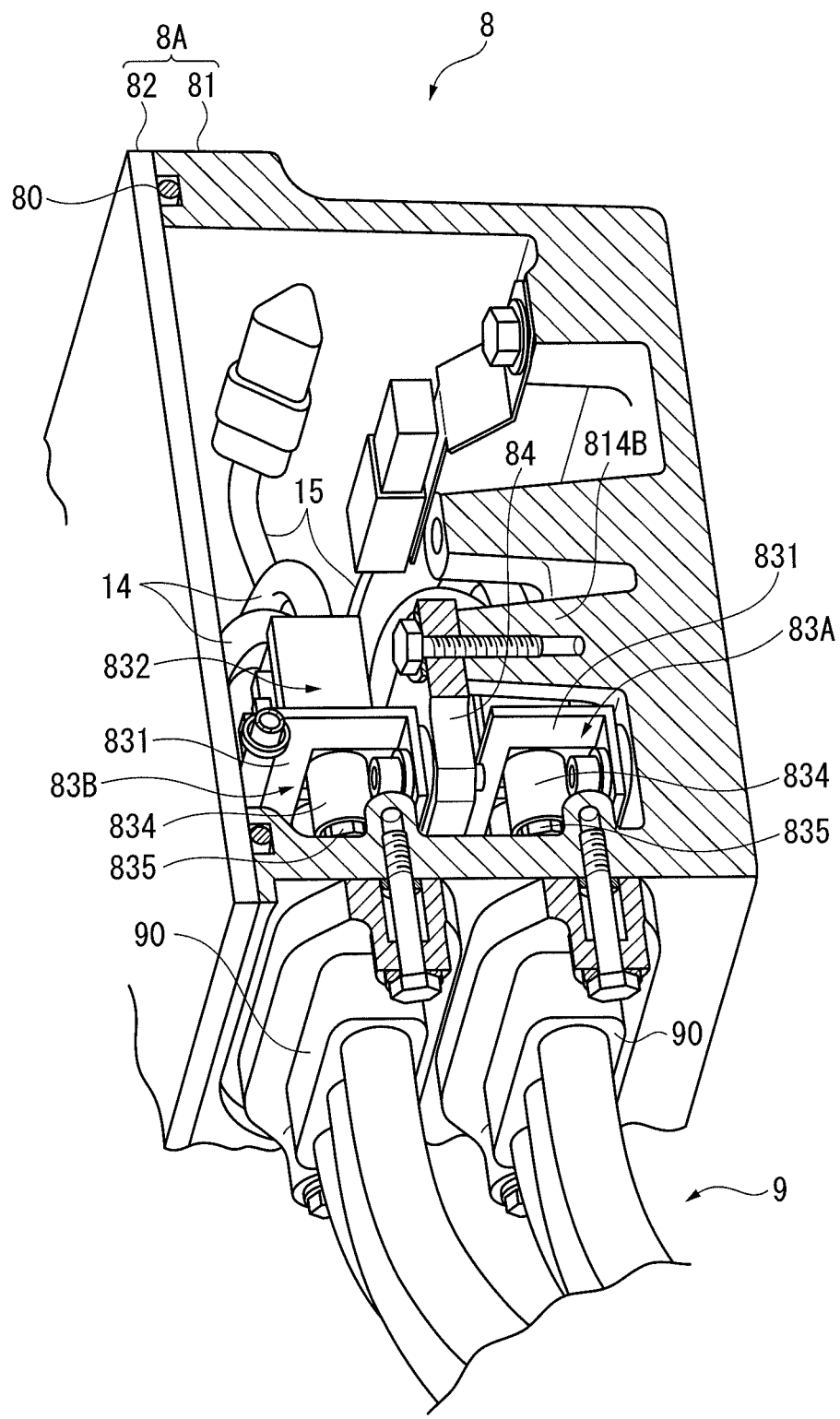
FIG. 8 is a cross-sectional view taken along the line VIII-VIII of FIG. 4.

As shown in FIG. 8, the terminal box 8 includes: a casing 8A; sockets 83A and 83B (connectors) that are housed in an inner space of the casing 8A and to which the conductive line 14 from the stator 55 is connected; and a support plate 84 (support member) that supports the socket 83B, in which the sockets 83A and 83B are housed in a double-layer arrangement in the direction of the rotation shaft of the generator motor 5.

The casing 8A includes a case 81 having an inner space, and a cover member 82 that closes the inner space of the case 81. Each of the case 81 and the cover member 82 is made of a material different from that for the housing 51 of the generator motor 5. Specifically, the housing 51 is made of cast iron, whereas the case 81 is made of aluminium (anti-corrosive material). On the other hand, the cover material 82 is made of a steel material having a galvanized surface. A gap between the case 81 and the cover member 82 is sealed by an O-ring 80 (sealing member).

Figure 9:
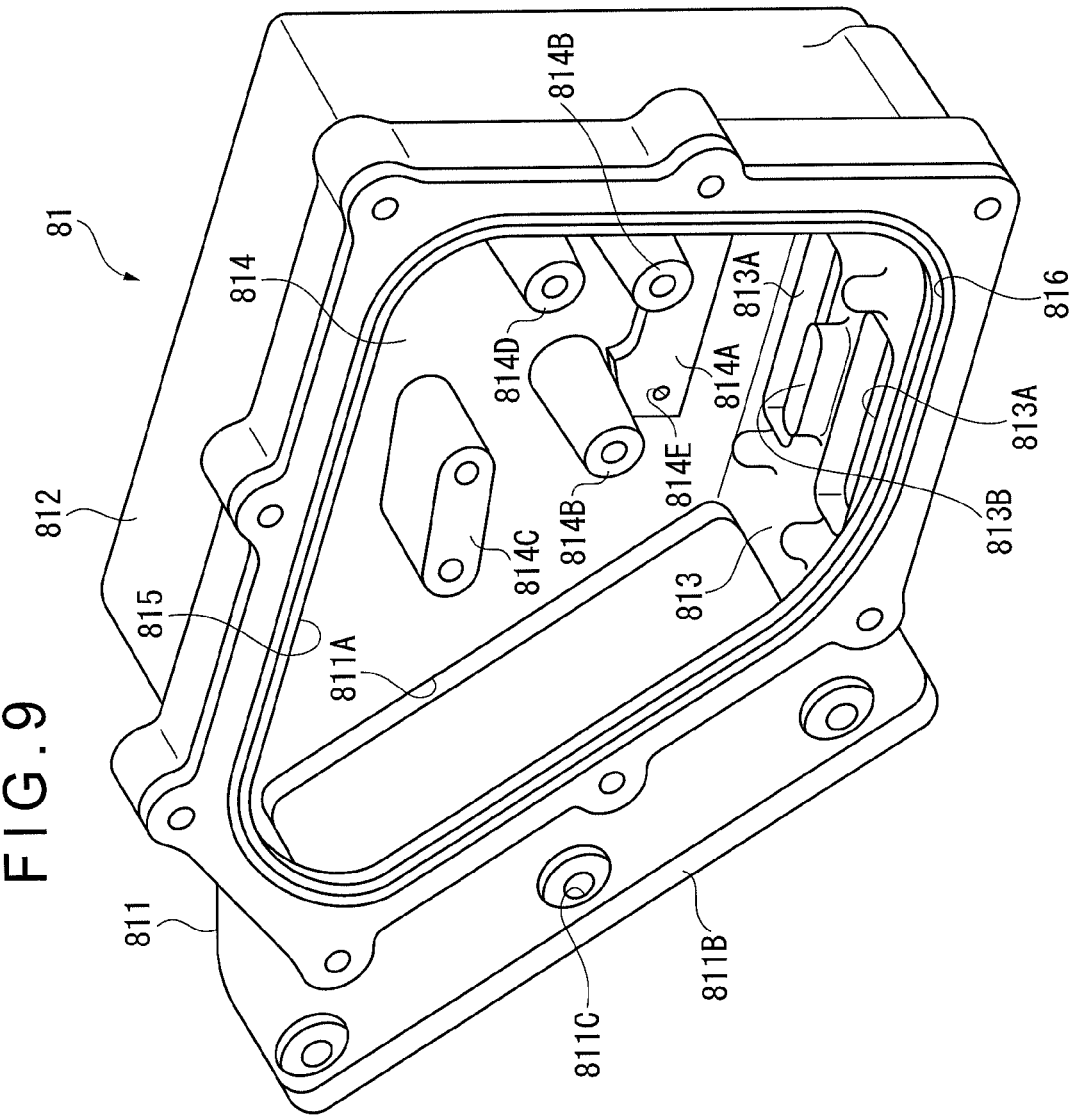
FIG. 9 is a perspective view of a case of a terminal box.

As shown in FIG. 9, the case 81 is shaped substantially in a pentagon in a side view. The case 81 includes: a fixing surface 811 that is fixed to the pump-side housing 53; an upper surface 812 and a bottom 813 that are vertically opposed to each other when the terminal box 8 is fixed to the pump-side housing 53; a side surface 814 that is orthogonal to each of the fixing surface 811, the upper surface 812 and the bottom 813; and an opening 815 that is opposed to the side surface 814 with the inner space of the case 81 being interposed between the opening 815 and the side surface 814.

While the terminal box 8 is fixed to the pump-side housing 53, the fixing surface 811 is inclined relative to bottom 813 such that the bottom 813 is substantially horizontal. The fixing surface 811 has a cable-insertion hole 811A that is in communication with the cable-insertion hole 533 of the pump-side housing 53 and through which the conductive line 14 and the signal lines 15 are inserted. By the cable-insertion hole 811A and the cable-insertion hole 533 of the generator motor 5, the inner space of the terminal box 8 is brought in direct communication with the inside of the housing 51 of the generator motor 5. A flange 811B is formed around the cable-insertion hole 811A of the fixing surface 811. The flange 811B has a bolt hole 811C for fixing the terminal box 8 to the pump-side housing 53.

On the bottom 813, two plugging/unplugging openings 813A for the power cable 9 are provided corresponding to the sockets 83A and 83B. Specifically, while the terminal box 8 is fixed to the pump-side housing 53, the plugging/unplugging openings 813A are juxtaposed in the direction of the rotation shaft of the generator motor 5. A projection 813B is formed in a manner to project from an inner surface of the bottom 813. A distal end of the support plate 84 is brought into contact with the projection 813B.

The side surface 814 is located near the engine 4 when the terminal box 8 is fixed to the pump-side housing 53. On an inner surface of the side surface 814, a socket fixing portion 814A to which the socket 83A is fixed; a plate fixing portion 814B to which the support plate 84 is fixed; a conductive-line holder 814C to which a holding bracket 85 (see FIG. 11) for the conductive line 14 is fixed; and a signal-line holder 814D to which a holding bracket 86 (see FIG. 11) for the signal lines 15 is fixed.

The socket fixing portion 814A is provided closer to the bottom 813 than the plate fixing portion 814B of the side surface 814 is and is in a step-up shape from the inner surface of the side surface 814. The socket fixing portion 814A has a bolt hole 814E for fixing the socket 83A.

The plate fixing portion 814B is provided opposite to the bottom 813 with the socket fixing portion 814A interposed therebetween. The plate fixing portion 814B is shaped in a cylinder having a height from the inner surface of the side surface 814 larger than a height of the socket fixing portion 814A.

The conductive-line holder 814C is positioned closer to the upper surface 812 and closer to the fixing surface 811 than the plate fixing portion 814B is. The conductive-line holder 814C is shaped in a cylindroid having a height from the inner surface of the side surface 814 smaller than the height of the plate fixing portion 814B.

A plurality of signal-line holders 814D are provided to the side surface 814. One of the signal-line holders 814D is shown in FIG. 9. The signal-line holders 814D are positioned so as to surround the socket fixing portion 814A, the plate fixing portion 814B and the conductive-line holder 814C from near the upper surface 812.

The opening 815 is open toward the hydraulic pump 6 when the terminal box 8 is fixed to the pump-side housing 53. An O-ring groove 816 for the O-ring 80 is provided on the periphery of the opening 815.

Figure 10:
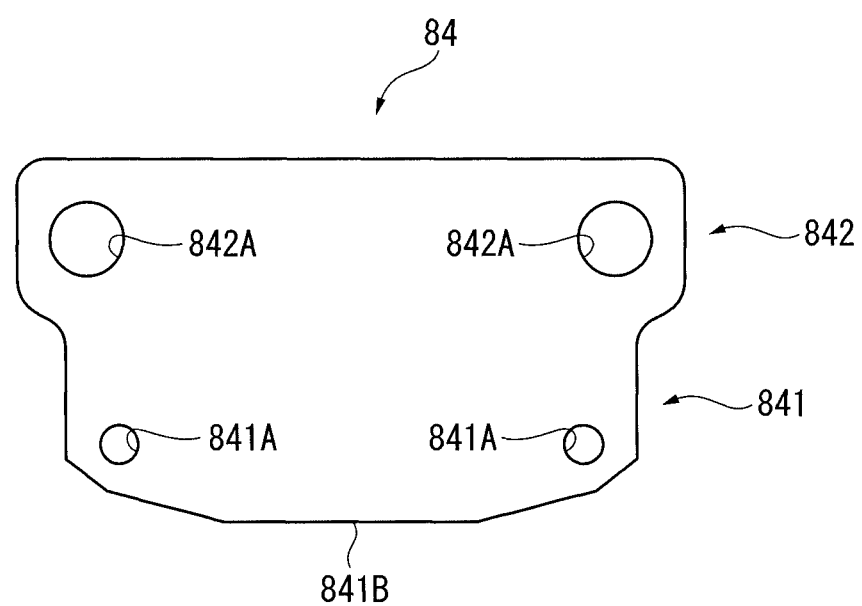
FIG. 10 is a plan view of a support plate fixed to the terminal box.

As shown in FIG. 10, the support plate 84 includes a narrow part 841 and a wide part 842. A width of the narrow part 841 is smaller than a width of the wide part 842. Bolt holes 841A for fixing the socket 83B are formed on both sides of the narrow part 841 in a width direction. A contact end 841B in contact with the projection 813B of the case 81 is provided at an end of the narrow part 841. On the other hand, bolt holes 842A for fixing the support plate 84 to the plate fixing portion 814B of the case 81 are formed on both sides of the wide part 842 in a width direction.

Figure 11:
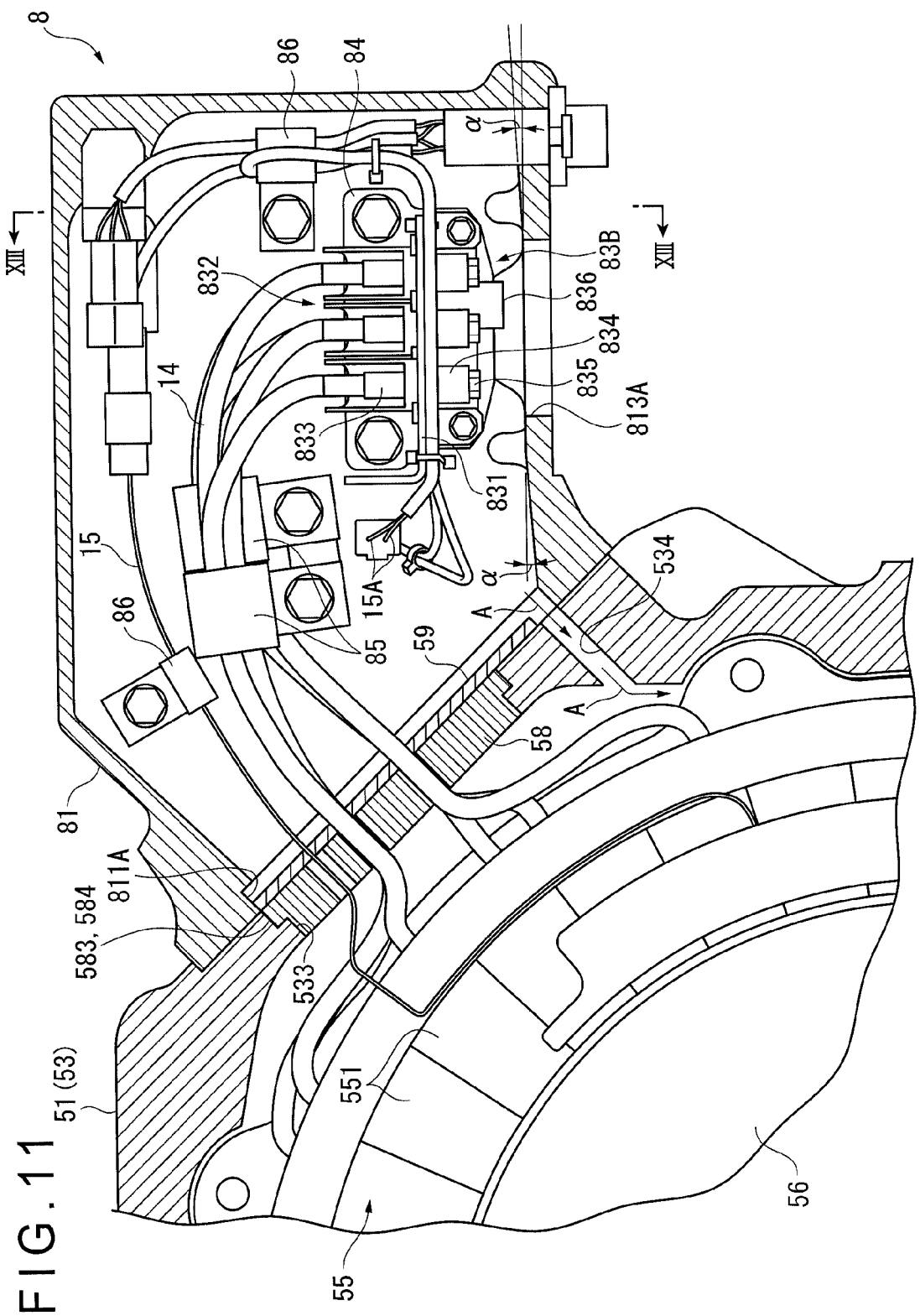
FIG. 11 is a cross-sectional view taken along the line XI-XI of FIG. 5.

As shown in FIGS. 8 and 11, the socket 83A (83B) includes a metallic L-shaped bracket 831 and a resin-made receptacle 832 fixed to the bracket 831. The socket 83A (83B) is fixed to the case 81 by a bolt to be inserted through a bolt hole of the bracket 831. The receptacle 832 is divided by the bracket 831 fixed thereto into a first part and a second part. A terminal 833 to which the conductive line 14 from the stator 55 is connected is provided in the first part while three holders 834 in which a later-described plug 90 of the power cable 9 are fitted are provided in the second part. A metallic and conductive socket contact 835 in a cylindrical shape is buried in each of the holders 834. The socket 83A (83B) is disposed in the terminal box 8 such that the socket contact 835 faces downward.

Figure 12:
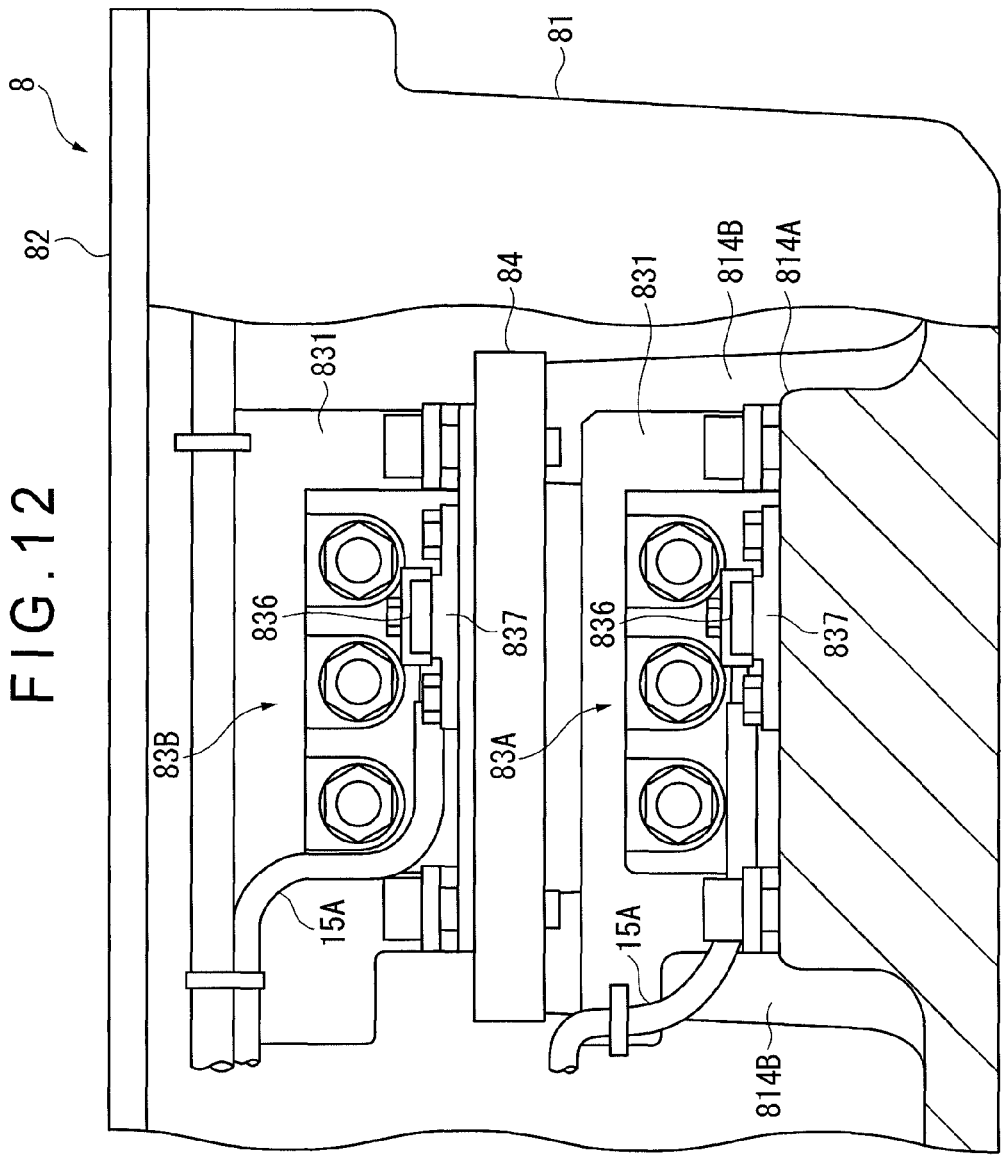
FIG. 12 shows the terminal box seen from a bottom thereof.

As shown in FIG. 12, the socket 83A (83B) includes a contact terminal 836 serving as a part of an interlock switch for detecting a connecting condition between the terminal box 8 and the power cable 9. The contact terminal 836 is made of an elastic metallic member shaped in a plate spring. The contact terminal 836 is provided to a resin-made support member 837 fixed to the bracket 831 and is electrically connected to the inverter 10 through a signal line 15A. While the plug 90 is properly fitted in each of the sockets 83A and 83B, a later-described contact conductor 971 (see FIG. 14) of the plug 90 is automatically brought into contact with the contact terminals 836 of the sockets 83A and 83B to electrically communicate the contact terminals 836 with each other. Moreover, in this condition, since each of the contact terminals 836 is pressed by the contact conductor 971 to be elastically deformed, mutual contact condition is kept favorable by elastic force of the contact terminals 836.

In order to dispose the sockets 83A and 83B in a double-layer arrangement within the terminal box 8, the socket 83A is bolted to the socket fixing portion 814A of the case 81, and then, the support plate 84 is bolted to the plate fixing portion 814B. Subsequently, the socket 83B is bolted on the fixed support plate 84, so that a pair of sockets 83A and 83B are disposed in a double-layer arrangement with the support plate 84 interposed therebetween.

Meanwhile, a detector of the inverter 10 outputs a detection pulse for detecting a fitting condition through the signal line 15A. This detection pulse passes through the contact terminal 836 and the contact conductor 971 (see FIG. 14) and returns to the inverter 10 through the signal line 15A. When the returned detection pulse is detected by the detector for detecting pulse waves, the detector being provided in the inverter 10, it is determined that the plug 90 is properly fitted in each of the sockets 83A and 83B.

For instance, when the socket 83B is fixed to the plug 90 in a manner to be too close to the upper surface 812, or when the socket 83B is diagonally fixed to the plug 90 relative to an axial direction of the plugging/unplugging opening 813A, contact failure may occur between the contact terminal 836 of the socket 83B and the contact conductor 971 of the plug 90 and between the socket contact 835 and a later-described pin contact 95 of the plug 90. In this case, since the contact conductor 971 is not properly in contact with the contact terminals 836 of the sockets 83A and 83B, a detection pulse neither returns to the inverter 10 nor is detected by the detector. Accordingly, the fitting between the sockets 83A, 83B and the plug 90 is determined to be incomplete or completely apart, so that a fail-safe processing such as deactuating of the hybrid hydraulic excavator 1 is carried out. In order to prevent such an erroneous detection, positioning of the sockets 83A and 83B in the terminal box 8, particularly, positioning of the socket 83B fixed to the case 81 through the support plate 84 becomes crucial.

Figure 13:
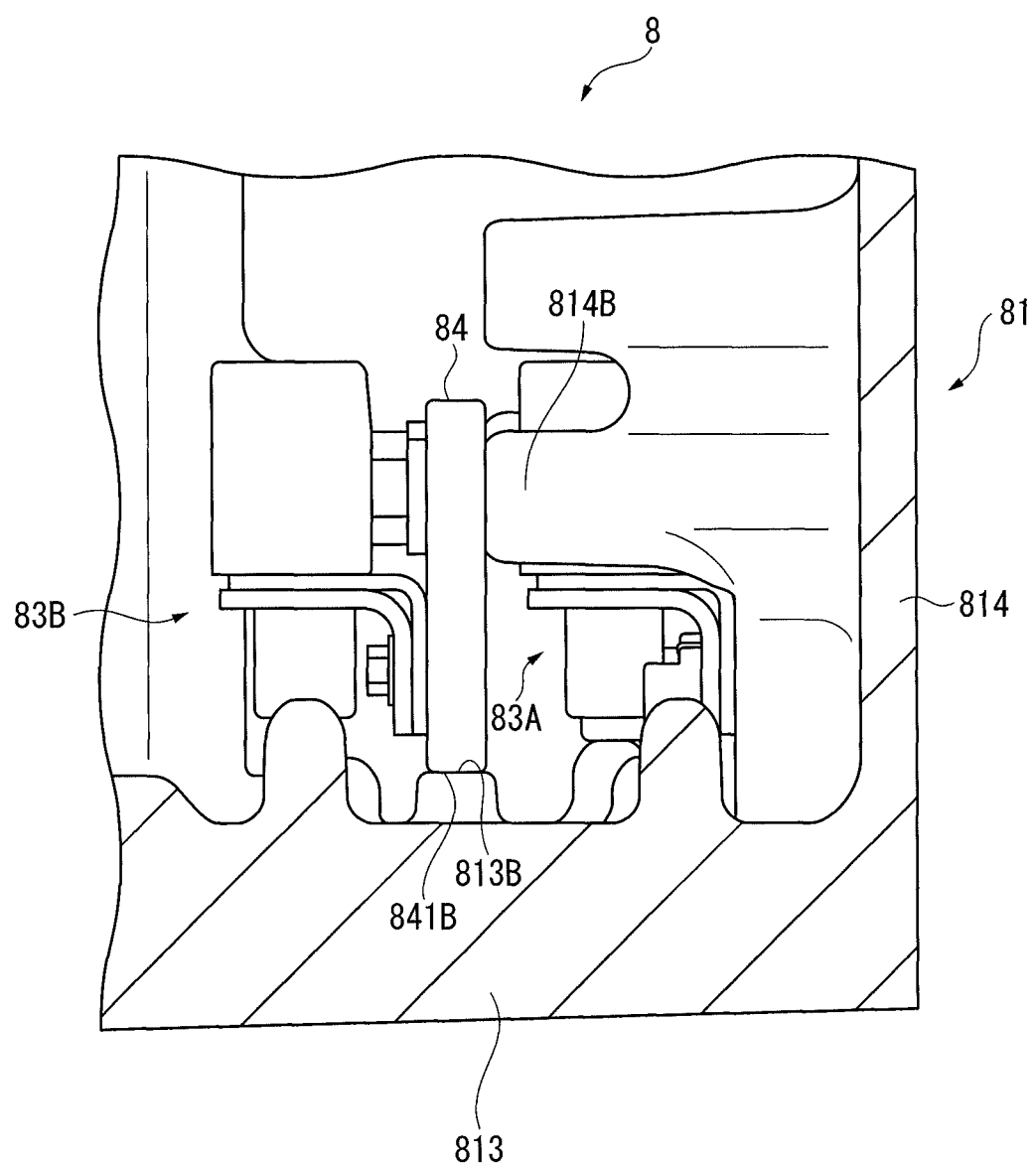
FIG. 13 is a cross-sectional view taken along the line XIII-XIII of FIG. 11.

Accordingly, the socket 83B placed on the support plate 84 is fixed to the support plate 84 after the support plate 84 is positioned in the case 81. Specifically, as shown in FIG. 13, the support plate 84 is fixed to the plate fixing portion 814B of the side surface 814 while the contact end 841B is brought into contact with the projection 813B of the bottom 813 along a direction in which the power cable 9 is attached or detached. Thus, the support plate 84 is positioned in a top-and-down direction in the figure and in a direction orthogonal to the paper. In other words, the bolt hole 814E provided in the socket fixing portion 814A of the case 81 and a bolt hole 841A provided near the contact end 841B of the support plate 84 are equidistant from the plugging/unplugging opening 813A, so that the sockets respectively fixed to bolt holes 814E and 841A becomes aligned. Thus, by fixing the socket 83B to the support plate 84 already positioned in the terminal box 8, the socket 83B is properly positioned in the terminal box 8.

4. Structure of Plug of Power Cable

Figure 14:
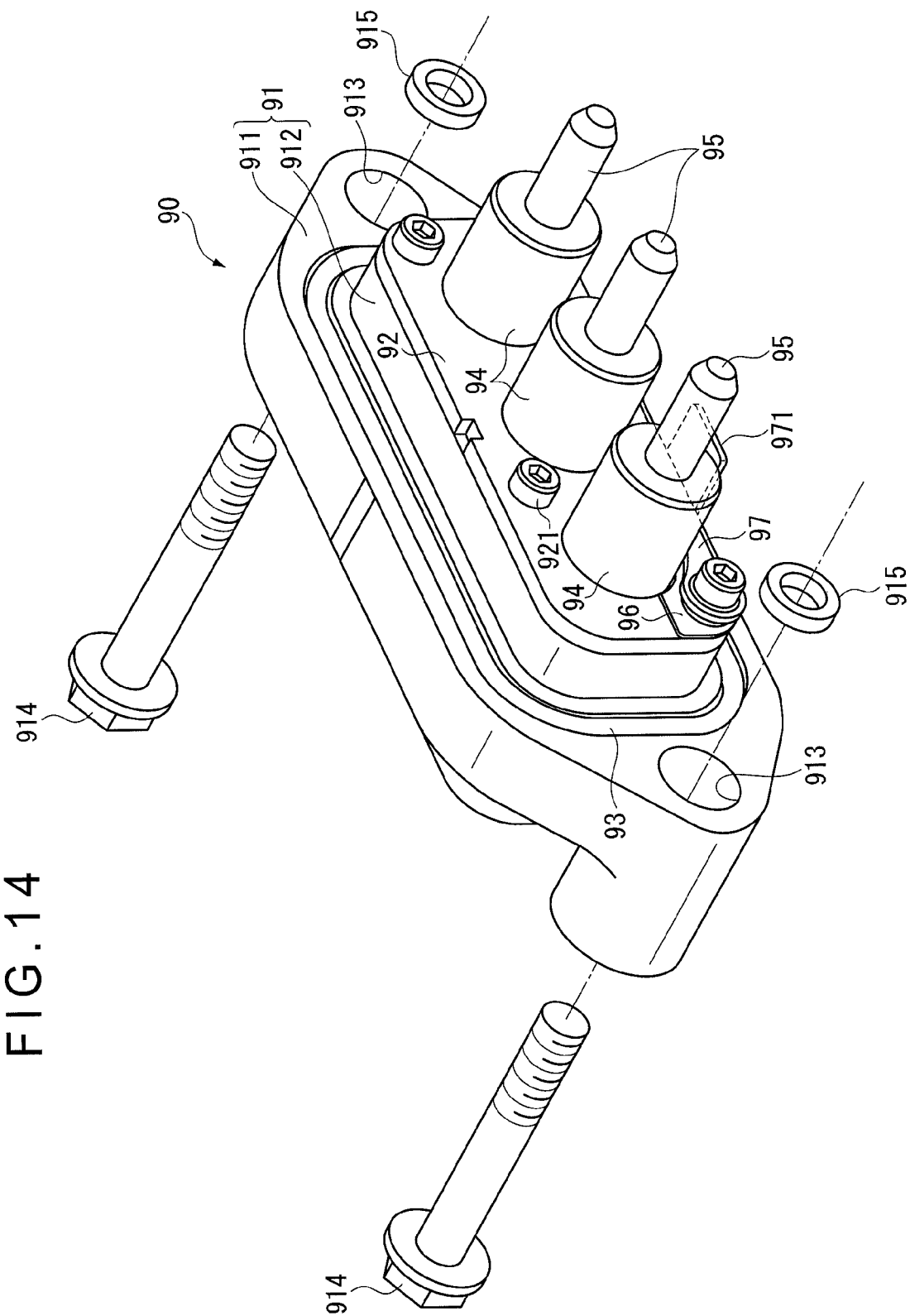
FIG. 14 is a perspective view of a plug to be connected to the terminal box.

As shown in FIG. 14, the plug 90 includes: a conductive plug housing 91 through which three power cables 9 are inserted; and a metallic plate 92 that covers an opening on a front (opposite to a side where the cables are inserted) of the plug housing 91.

The plug housing 91 includes: a contact portion 911 that is brought into contact with an exterior of the case 81 of the terminal box 8 when the plug 90 is fitted in the sockets 83A and 83B of the terminal box 8; and a projection 912 that is formed in a manner to project from the contact portion 911 and is inserted into the plugging/unplugging opening 813A of the terminal box 8.

The contact portion 911 includes a seal ring 93 that surrounds the projection 912. When the plug 90 is fitted in the sockets 83A and 83B of the terminal box 8, a gap between the contact portion 911 and the exterior of the case 81 of the terminal box 8 is sealed by the seal ring 93.

In the plug housing 91, a holder 94 is provided for each of the cables. The cables are inserted into the holders 94. The conductive pin contact 95 is attached to a tip end of each of the cables inserted into the holders 94 and projects from a round hole formed in each of the holders 94.

The plate 92 is fixed to the plug housing 91 by a plurality of screws 921. Both front and back surfaces and circumferential end surfaces of the plate 92, an inner circumferential surface of an insertion hole for the screws 921, and an inner surface of an opening for inserting the holder 94 are entirely covered with insulating coating. For insulating coating, for instance, a fluorine coating is employed in view of heat resistance, wear resistance and water repellency. Due to this insulating coating, the plate 92 becomes insulated against the plug housing 91 electrically grounded.

A conductive terminal 97 is fixed to the front surface of the plate 92 through an insulative plate 96 made of a glass-epoxy composite material. The insulative plate 96 and the conductive terminal 97 are fixed to the plate 92 by the above-described screws 921. A material for the conductive terminal 97 only needs to be conductive. Although the material is not limited, brass is used in the exemplary embodiment.

The contact conductor 971, which is shaped in a quadrangular piece folded in a fitting direction to the sockets 83A and 83B, is integrally provided to the conductive terminal 97. As described above, the contact conductor 971 is a portion in contact with the contact terminals 836 of the sockets 83A and 83B when the plug 90 is fitted in the sockets 83A and 83B.

The conductive terminal 97 is coated with insulating coating in the same manner as the plate 92, except for a contact area (i.e., contact conductor 971) in contact with the contact terminal 836. Accordingly, not only the insulative plate 96 enables insulation between the plate 92 and the conductive terminal 97, but also the insulating coating of the plate 92 and the conductive terminal 97 further ensures insulation therebetween, resulting in reliable insulation between the conductive terminal 97 and the plug housing 91.

In the plug 90 as arranged above, the contact portion 911 of the plug housing 91 has a bolt hole 913 for fixing the plug 90 to the terminal box 8. The plug 90 is fixed to the case 81 of the terminal box 8 by a bolt 914 inserted through the bolt hole 913. Here, a bolt slip prevention member 915 in a form of a ring made of rubber, resins and the like is fitted in a screw part of the bolt 914. The bolt slip prevention member 915 prevents the bolt 914 from slipping off the plug 90.

5. Operations and Advantages of Embodiment(s)

In the hybrid hydraulic excavator 1 as arranged above, since the large-sized generator motor 5 having a large capacity is used, for instance, a weight of the stator 55 becomes extremely heavy as compared with that in an automobile. However, since the case 81 of the terminal box 8 is detachably provided to the pump-side housing 53 of the generator motor 5, while the terminal box 8 is kept detached from the pump-side housing 53, the stator 55 can be housed in the pump-side housing 53 of the generator motor 5 and the conductive line 14 of the stator coil 551 can be easily pulled out through the cable-insertion hole 533. Once the conductive line is pulled out, the pulled-out conductive line can be easily drawn into the terminal box, so that a satisfactory assembly performance can be secured.

Moreover, since the terminal box 8 is made of a material having a lighter weight than that for the housing 51 of the generator motor 5, the centroid of the generator motor 5 can be brought toward the rotation shaft, so that vibration of the generator motor 5 and the engine 4 directly connected to the generator motor 5 is suppressible.

Moreover, in the terminal box 8, since the plurality of sockets 83A and 83B are juxtaposed in the direction of the rotation shaft of the generator motor 5, a size of the terminal box 8 in a plane orthogonal to the rotation shaft of the generator motor 5 is reducible. Accordingly, the terminal box 8 is prevented from significantly projecting beyond the generator motor 5, so that the terminal box 8 can be more freely disposed.

However, for instance, when air containing moisture or water drops enter the terminal box 8 through the opening 261 of the engine hood 26 or the housing 51 of the generator motor 5, the drops adhere on the terminals 833 of the sockets 83A and 83B, the socket contact 835, the pin contact 95 of the plug 90 of the power cable 9 and the like, an electric-power-supplying line between the generator motor 5 and the inverter 10 may possibly be short-circuited or grounded. When moisture adheres on the contact terminals 836 of the sockets 83A and 83B or the contact conductor 971 of the plug 90, the signal line 15A may possibly be short-circuited or grounded to cause an erroneous detection. Further, when the moisture adheres on the case 81 or the cover member 82, the case 81 or the cover member 82 may possibly gather rust to cause short circuit and grounding.

In contrast, in the terminal box 8, since the plugging/unplugging opening 813A for the power cable 9 is provided on the bottom 813 of the terminal box 8, for instance, even when water or dust enter the engine room 25 through the opening 261 of the engine hood 26, water drops falling from above can be prevented from entering the terminal box 8. Accordingly, short-circuit or grounding of the electric-power-supplying line and the signal lines 15,15A can be prevented.

Moreover, since the case 81 of the terminal box 8 is made of aluminium and the surface of the cover member 82 is galvanized, the terminal box 8 can be suppressed from gathering rust. Accordingly, occurrence of short-circuit or grounding caused by rust as well as corrosion of the case are preventable.

In the terminal box 8, while the case 81 is provided to an exterior of the generator motor 5, the sockets 83A and 83B are disposed facing downward and one end of the power cable 9 is inserted into the plugging/unplugging opening 813A from underneath the terminal box 8 to be connected to each of the sockets 83A and 83B. With this arrangement, the power cable 9 connected to the terminal box 8 extends downward along the generator motor 5 from the terminal box 8, but does not project upward or sideward beyond the terminal box 8. Accordingly, for instance, even when the muffler 13 and the counterweight 24 are disposed near the terminal box 8, the power cable 9 can be prevented from interfering with the muffler 13 and the counterweight 24. Moreover, since the power cable 9 is opposite to the muffler 13 with the terminal box 8 interposed therebetween, the power cable 9 is less likely to be affected by heat of the muffler 13, so that the power cable 9 can be prevented from being degraded by the heat.

As shown in FIG. 11, the inner surface of the terminal box 8 is communicated with the inside of the housing 51 through the cable-insertion hole 811A of the case 81 and the cable-insertion hole 533 of the pump-side housing 53. Accordingly, the cable-insertion hole 533 of the pump-side housing 53 is closed by the grommet 58 so as to prevent the mist-like cooling oil, which is obtained by being splashed in the housing 51, from entering the terminal box 8. Here, since the flanges 583 and 584 of the grommet 58 are locked on an edge of the cable-insertion hole 533, the grommet 58 is prevented from falling into the cable-insertion hole 533 of the pump-side housing 53.

Although the housing 51 is sealed by the grommet 58 so as to avoid the cooling oil or moisture from leaking into the terminal box 8, a part of the cooling oil or moisture in a form of mist occasionally enter the terminal box 8 through the cable-insertion hole 533 and 811A. For this reason, the oil return hole 534 for returning the oil and the moisture having entered the terminal box 8 to the generator motor 5 is provided in the pump-side housing 53.

The inner surface of the bottom 813 is inclined downward toward the pump-side housing 53 of the generator motor 5 only by a predetermined angle $\alpha$ relative to a horizontal direction. With this arrangement, the cooling oil accumulated in the bottom 813 after entering the terminal box 8 flows on the bottom 813 toward the pump-side housing 53. As shown in an arrow A, the cooling oil passes through the cable-insertion hole 811A also serving as an oil return hole of the terminal box 8 and through the oil return hole 534 of the pump-side housing 53 and is returned into the housing 51. Accordingly, the oil entering the terminal box 8 can be returned into the housing 51 without accumulating in the terminal box 8.

It should be understood that the scope of the invention is not limited to the above-described exemplary embodiment but includes modifications and improvements as long as the modifications and improvements are compatible with the invention.

Although the case 81 of the terminal box 8 is exemplarily made of aluminium and the cover member 82 is exemplarily made of a steel material having a galvanized surface in the exemplary embodiment, a material for the casing 8A of the terminal box 8 is not limited thereto. In short, it is only required that the casing 8A of the terminal box 8 is detachably provided to the housing 51 of the generator motor 5. For instance, the case 81 and the cover member 82 may be made of resins, or the entire casing 8A including the cover member 82 may be made of aluminium.

Provided that the casing 8A of the terminal box 8 is detachable from the housing 51 of the generator motor 5, the casing 8A may be made of the same material as a material for the housing 51. For instance, the casing 8A of the terminal box 8 and the housing 51 of the generator motor 5 are provided by separate bodies formed by aluminium casting and the casing 8A is detachably provided to the housing 51. In this arrangement, since the housing 51 of the generator motor 5 is made of aluminium, heat release performance of the generator motor 5 can be enhanced.

The casing 8A of the terminal box 8 is preferably made of an anti-corrosive material or a material whose surface is treated with a corrosion protection processing. For instance, the case 81 and the cover member 82 may be made of titanium.

In the exemplary embodiment, the cable-insertion hole 811A of the terminal box 8 also serves as the oil return hole. In addition to the cable-insertion hole 811A, the case 81 may have another oil return hole. Through the another oil return hole and the oil return hole 534 of the pump-side housing 53, the cooling oil having entered the terminal box 8 may be returned into the housing 51.

In the exemplary embodiment, while the case 81 of the terminal box 8 is provided the exterior of the generator motor 5, the sockets 83A and 83B are juxtaposed in the direction of the rotation shaft of the generator motor 5. However, the sockets 83A and 83B may be juxtaposed in any direction. It is only required that the sockets 83A and 83B are juxtaposed in a direction intersecting an orthogonal plane that is orthogonal to the rotation shaft of the generator motor 5. For instance, the sockets 83A and 83B may be juxtaposed in a direction diagonally intersecting the orthogonal plane.

In the exemplary embodiment, the support plate 84 is used as a support member for supporting the socket 83B. However, the shape of the support member is not limited to that of the support plate 84. The support member only needs to support and position the socket 83B. The support member may be provided by a member having a shape other than a plate-shape.

In the exemplary embodiment, the grommet 58 is fitted in the cable-insertion hole 533 of the generator motor 5. However, for instance, the grommet 58 may be fitted in the cable-insertion hole 811A of the terminal box 8, or may be fitted in each of the cable-insertion hole 533 and the cable-insertion hole 811A. The grommet 58 is not essential. Accordingly, no grommet 58 may be arranged.

In the exemplary embodiment, the muffler 13 is fixed to the generator motor 5. However, the location of the muffler 13 is not limited to this. For instance, the muffler 13 may be provided to the rotary body 22.

In the exemplary embodiment, the rotation shaft of the engine 4 and the rotation shaft of the generator motor 5 are splined. However, a method of connecting mutual output shafts is not limited to this. For instance, the output shaft of the engine 4 may be connected to the generator motor 5 via PTO (Power Take Off).

In the exemplary embodiment, an SR motor is used for the generator motor 5. However, the generator motor 5 is not limited to this. For instance, the invention may be applicable to a generator motor other than a PM (Permanent Magnet) motor and the like.

Although the exemplary embodiment describes when the invention is applied to the hybrid hydraulic excavator 1, the invention may be applicable to work machines such as a wheel loader, a bulldozer, a dump truck and the like.

INDUSTRIAL APPLICABILITY

The invention is applicable to a work machine such as an earth-moving machine, an agricultural machine, a driving vehicle and a delivery vehicle other than a hybrid hydraulic excavator.

EXPLANATION OF CODES

1: hybrid hydraulic excavator (work machine), 3: working equipment, 4: engine, 5: generator motor, 6: hydraulic pump, 8: terminal box, 8A: casing, 9: power cable (electric-power-supplying cable), 51: housing, 58: grommet (closing member), 81: case, 82: cover member, 83A, 83B: socket (connector), 533: cable-insertion hole, 534: oil return hole (communication hole)

The invention claimed is:
1. A generator motor connected to an output shaft of an engine mounted in a work machine, the generator motor comprising:

a terminal box for connecting an exterior electric-power-supplying cable to the generator motor, the terminal box having a casing that defines
an inner space in communication with an inside of a housing of the generator motor;
wherein a cable-insertion hole enables communication between the inside of the generator motor and the inner space,
wherein a communication hole that is separate from the cable-insertion hole is provided at a position vertically below the cable-insertion hole, the communication hole enabling additional communication between the inside of the generator motor and the inner space, and
wherein the casing of the terminal box is detachably provided to the housing of the generator motor at a position that is vertically above a rotation shaft of the generator motor.

2. The generator motor according to claim 1, wherein the casing of the terminal box is made of a material having a lighter weight than that of a material for the housing of the generator motor.

3. The generator motor according to claim 1, wherein the casing of the terminal box is made of an anti-corrosive material or a surface of the casing is treated with a corrosion protection processing.

4. The generator motor according to claim 1, wherein the casing of the terminal box is made of aluminium.

5. The generator motor according to claim 1, wherein the casing of the terminal box comprises:
a case detachably provided to the housing of the generator motor; and
a cover member for closing an inner space of the case with a seal member interposed between the cover member and the case, wherein
the casing is made of aluminium, and
the cover member is made of a steel material having a galvanized surface.

6. The generator motor according to claim 1, wherein an inside of the generator motor is cooled by a cooling medium.

7. The generator motor according to claim 1, wherein the terminal box is attached to the generator motor at a position lower than a top surface of the generator motor.

8. The generator motor according to claim 1, further comprising:
a closing member that closes the cable-insertion hole except for the cable.

9. The generator motor according to claim 1, wherein the terminal box houses a connector for connecting the exterior electric-power-supplying cable to the generator motor; and
when the terminal box is connected to the housing of the generator motor, the connector is disposed facing downward and the electric-power-supplying cable is connectable to the connector from underneath the connector.

10. The generator motor according to claim 1, wherein the terminal box houses a plurality of connectors for connecting the exterior electric-power-supplying cable to the generator motor; and
when the terminal box is connected to the housing of the generator motor, the plurality of connectors are juxtaposed in a direction of the rotation shaft of the generator motor.

11. A work machine comprising:
a working equipment;
a hydraulic pump that drives the working equipment; and
the generator motor according to claim 1, wherein
the hydraulic pump is provided to the generator motor.

12. The generator motor according to claim 6, wherein the cooling medium comprises a cooling oil.

13. A generator motor connected to an output shaft of an engine mounted in a work machine, the generator motor comprising:
a terminal box for connecting an exterior electric-power-supplying cable to the generator motor, the terminal box having a casing that defines an inner space in communication with an inside of a housing of the generator motor; and
a fixing portion for attaching the terminal box to the generator motor,
wherein the fixing portion defines a cable-insertion hole that enables communication between the inside of the generator motor and the inner space, and defines a separate communication hole provided at a position vertically below the cable-insertion hole that enables additional communication between the inside of the generator motor and the inner space, and
wherein the casing of the terminal box is detachably provided to the housing of the generator motor at a position that is vertically above a rotation shaft of the generator motor.

14. The generator motor according to claim 13, wherein the casing of the terminal box is made of a material having a lighter weight than that of a material for the housing of the generator motor.

15. The generator motor according to claim 13, wherein the casing of the terminal box comprises:
a case detachably provided to the housing of the generator motor; and
a cover member for closing an inner space of the case with a seal member interposed between the cover member and the case, wherein
the casing is made of aluminium, and
the cover member is made of a steel material having a galvanized surface.

16. The generator motor according to claim 13, wherein an inside of the generator motor is cooled by a cooling medium.

17. The generator motor according to claim 16, wherein the cooling medium comprises a cooling oil.

18. The generator motor according to claim 13, wherein the terminal box is attached to the generator motor at a position lower than a top surface of the generator motor.

19. The generator motor according to claim 13, wherein the terminal box houses a connector for connecting the exterior electric-power-supplying cable to the generator motor; and
when the terminal box is connected to the housing of the generator motor, the connector is disposed facing downward and the electric-power-supplying cable is connectable to the connector from underneath the connector.

20. The generator motor according to claim 13, wherein the terminal box houses a plurality of connectors for connecting the exterior electric-power-supplying cable to the generator motor; and
when the terminal box is connected to the housing of the generator motor, the plurality of connectors are juxtaposed in a direction of the rotation shaft of the generator motor.

* * * * *